United States Patent [19]
Pittman

[11] Patent Number: 5,464,078
[45] Date of Patent: Nov. 7, 1995

[54] HYDRAULIC DISC BRAKE ACTUATOR

[76] Inventor: Jerry W. Pittman, P.O. Box 610149, Dallas, Tex. 75261

[21] Appl. No.: 209,771

[22] Filed: Mar. 11, 1994

[51] Int. Cl.⁶ ............................................. B60T 7/20
[52] U.S. Cl. ............................................. 188/112 R; 303/7
[58] Field of Search ........................ 188/3 H, 112 R; 303/7; 280/428

[56] References Cited

U.S. PATENT DOCUMENTS

| | | | |
|---|---|---|---|
| 3,007,552 | 11/1961 | Eksergian | 188/112 R |
| 3,175,649 | 3/1965 | Kirk et al. | 188/112 R |
| 3,215,230 | 11/1965 | Wherry | 188/112 R |
| 3,768,606 | 10/1973 | Mizen et al. | 188/112 R |
| 3,796,287 | 3/1974 | Kolm | 188/112 R |
| 3,881,577 | 5/1975 | Wherry et al. | 188/112 R |
| 4,856,621 | 8/1989 | Yoder | 188/112 R |
| 5,036,956 | 8/1991 | Genier | 188/59 |
| 5,273,347 | 12/1993 | Hansson | 303/DIG. 4 |
| 5,273,348 | 12/1993 | Yagi et al. | 303/13 |
| 5,273,349 | 12/1993 | Kidston | 303/100 |

*Primary Examiner*—Robert J. Oberleitner
*Assistant Examiner*—Kevin D. Rutherford
*Attorney, Agent, or Firm*—Crutsinger, Booth & Kanz

[57] ABSTRACT

The hydraulic disc brake actuator for a trailer includes a first connector for securing the actuator to a towed vehicle; a second connector for securing the actuator to a towing vehicle; and a force multiplying parallel linkage apparatus connected between the first and second connectors for actuating a brake master cylinder. The master cylinder has a body portion and a plunger portion, the body portion being connected to one of the first or second connectors and the plunger portion being connected to the force multiplying apparatus such that the magnitude of force applied to the master cylinder is greater than the magnitude of force tending to move the first connector relative to the second connector. The parallel linkage supports and lifts the tongue weight of the trailer to dissipate energy, and to prevent binding between the connectors when they shift from a towing position to a braking position.

17 Claims, 3 Drawing Sheets

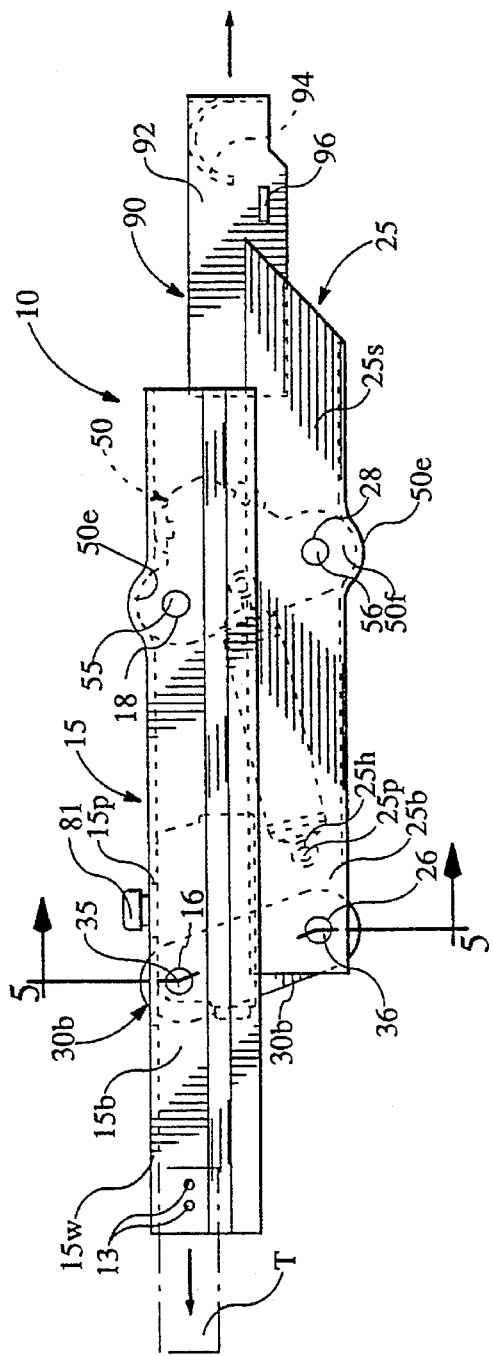
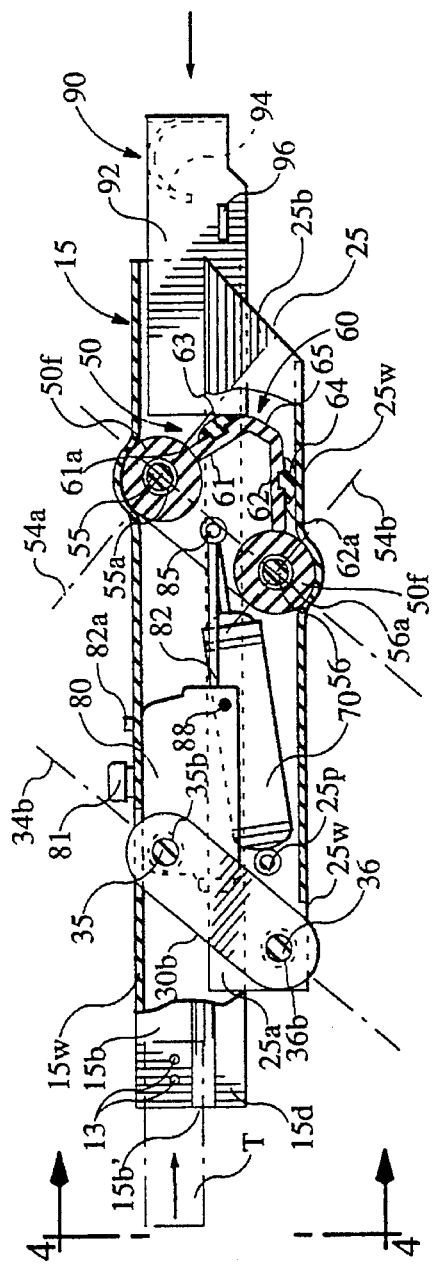
FIG. 3
FIG. 2

HYDRAULIC DISC BRAKE ACTUATOR

TECHNICAL FIELD

The present invention relates to a hydraulic disk brake actuator for trailers.

BACKGROUND OF INVENTION

Drum type brakes, rather than disc brakes, are generally used in trailer brake systems because brake actuators currently used do not develop sufficient pressure to actuate disc brake systems. The maximum pressure developed in these brake actuator devices is about 700 pounds per square inch (psi).

Disc brake systems are highly desirable because the braking force that can be developed is much greater than on a drum brake system. In trailer applications, there is a need for the greater braking capacity offered by disc brakes.

U.S. Pat. No. 3,796,287 discloses a surge type brake actuator for actuating hydraulically actuated brakes on a towed vehicle. The surge actuator assembly includes a telescoping housing assembly connected intermediate the ends of a tongue assembly. The housing has an outer tubular member connected to one portion and an inner tubular member connected to another portion of the tongue assembly and includes apparatus for providing force multiplication whereby an increased fluid pressure output can be obtained particularly for disk brake actuation. The force multiplication apparatus includes a toggle linkage system and a cam that actuates the joint of the toggle linkage. A shock absorber is interposed in the apparatus for providing a smoother brake operation.

A trailer tongue must support the "tongue weight" of the trailer. A trailer should be loaded so that the coupler on the trailer tongue is urged downwardly toward the hitch on the towing vehicle. Tubular members mounted in telescoping relation do not efficiently carry transverse loading without binding. Telescoping tubes, carrying a heavy tongue load transversely to the sliding joint is difficult to maintain in an efficient operating condition.

Apparatus is disclosed in U.S. Pat. No. 5,036,956 for use with tractor-trailer organizations in which a rotor is mounted fixedly and rotatably with a rear axle extending longitudinally and exteriorly of a rear axle housing, wherein the rotor includes a plurality of calipers. The calipers are actuated by a master cylinder positioned adjacent the rear axle and mounted on the axle housing. A torsion bar transmits rotative force from a remotely positioned pneumatic booster cylinder to the master cylinder utilizing cam collars mounted on the torsion bar for the master cylinder and pneumatic booster assembly.

A need exists for an inexpensive durable disk brake actuator that does not require use of pneumatic boosters or complex mechanisms for use on utility trailers, boat trailers, house and travel trailers and the like.

SUMMARY OF THE INVENTION

A hydraulic disc brake actuator for a trailer disclosed herein includes a first connector for securing the actuator to a trailer or other towed vehicle; a second connector for securing the actuator to a towing vehicle; and a force multiplying apparatus connected between the first and second connectors for actuating a brake master cylinder. The master cylinder has a body portion and a plunger portion. The body portion is connected to one of the first or second connectors and the plunger portion is connected to the force multiplying apparatus such that the magnitude of force applied to the master cylinder is greater than the magnitude of force applied by the trailer tending to move the first connector relative to the second connector.

A preferred embodiment of the hydraulic disc brake actuator disclosed herein includes an upper channel member secured to the tongue of a trailer and a lower channel member secured to a trailer hitch coupler. The upper channel member is downwardly facing, and the lower channel member faces upwardly defining an enclosure therebetween. Guide surfaces on the upper and lower channel connector members control the direction of movement of each connector member relative to each other.

The force multiplying apparatus connected between the first and second connectors for actuating the brake master cylinder, in the preferred embodiment disclosed herein, includes a front linkage module and a rear pair of links, forming a parallel linkage, positioned in the enclosure and pivotally securing the upper and lower channel members to allow relative translation of the upper and lower channel members. It is contemplated that other and further force multipliers may be substituted for the parallel linkage, such as rack and pinion gears, cranks, cam and follower or other suitable mechanisms.

The upper and lower channel members move between a towing position, wherein the lower channel member shifts toward the towing vehicle causing the front and rear linkages to rotate in a counter clockwise direction relative to the upper channel member, and a braking position, wherein the lower channel member shifts toward the towed vehicle causing the linkages to rotate clockwise relative to the upper channel member.

The two rear links that form a linkage assembly are preferably of identical construction. The links of the rear pair of links are secured to the upper channel member by a pin positioned in openings formed in the flanges of the upper channel member and are secured to the lower channel by a pin positioned in openings formed in the flanges of lower channel member. The front linkage module is also secured to upper channel member by a pin positioned in openings formed in flanges of upper channel member and to lower channel member by a pin positioned in openings formed in flanges of lower channel.

As previously stated, upper channel member is downwardly facing and lower channel is upwardly facing defining an enclosure therebetween. A master cylinder is positioned in the upper channel portion of the enclosure, between forward and rearward linkages, in fluid communication with brakes on the trailer. An actuator arm is provided which is pivotally secured to the forward linkage and extends to the master cylinder. When the lower channel translates toward the towed vehicle during braking, the actuator arm actuates a piston in the hydraulic brake cylinder in the master cylinder.

The parallel linkage formed by the front linkage module and the rear linkage assembly function not only as a brake actuator but also as a very efficient load transfer device. As the parallel links move from a towing position to a braking position the tongue of the trailer is initially elevated as the links move toward a top dead center position. This action absorbs some of the initial shock load when the brakes are applied and also reduces frictional contact between the channel-shaped connectors to reduce the possibility of failure of the actuator to function properly. Further, the arrangement of the linkage assembly and the linkage module assures free movement of parts of the brake actuator in the presence of mud and other foreign matter which tend to prevent free movement of actuator parts.

In addition, a shock absorber is mounted in the enclosure to absorb some of the impact load generated during braking. The shock absorber is pivotally secured to the forward linkage module and to the flanges of lower channel member so that translation of lower channel toward the towed vehicle during braking causes the shock absorber to contract, activating the deceleration characteristics of the shock absorber.

BRIEF DESCRIPTION OF THE DRAWING

Drawings of a preferred embodiment of the invention are annexed hereto, so that the invention may be better and more fully understood, in which:

FIG. 2 is a side elevational view of the disc brake actuator assembly illustrated in a braking position, parts being broken away to more clearly illustrate details of construction;

FIG. 3 is a side elevational view of the disc brake actuator assembly illustrated in a towing position;

Other and further objects and advantages of the invention will become apparent from the following detailed description and upon reference to the drawings, in which like reference characters are used throughout the drawings to designate like parts.

DESCRIPTION OF A PREFERRED EMBODIMENT

Figure 1:
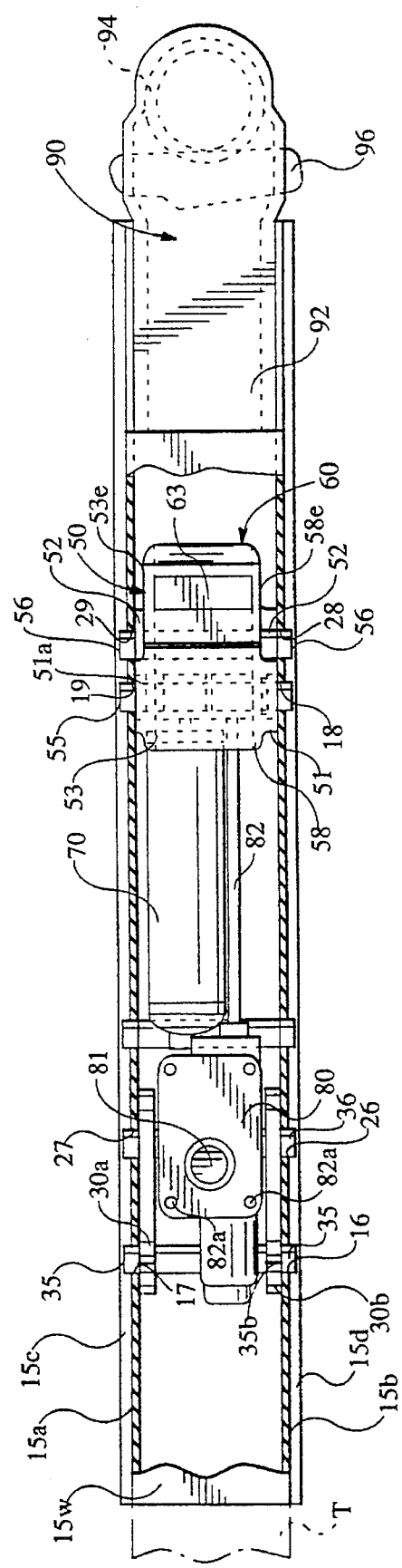
FIG. 1 is a top plan view of a preferred embodiment of the hydraulic disc brake actuator assembly according to the present invention.

A hydraulic disc brake actuator is generally designated by the numeral 10 in FIGS. 1–3 of the drawing. The hydraulic disc brake actuator 10 generally comprises a first connector 15 for securing the actuator to a trailer or other towed vehicle; a second connector 25 for securing the actuator to a trailer hitch on a towing vehicle (not shown), said first and second connectors 15 and 25 being mounted for relative movement. The body portion of a brake master cylinder 80 is pivotally connected to one of the connectors 15 or 25. In the illustrated embodiment, the master cylinder 80 is connected to the trailer tongue T and the trailer brakes are applied when the linkage module 50 rotates in a clockwise direction about the axes of pins 55 and 56 when the towing vehicle (not shown) decelerates.

A force multiplying apparatus is mounted between connectors 15 and 25 for providing a mechanical advantage such that the magnitude of force applied to the plunger portion of the master cylinder 80 is greater than the force exerted on the first connector 15 by the trailer for movement of the first connector 15 relative to the second connector 25, as will be hereinafter more fully explained.

Figures 4, 5:
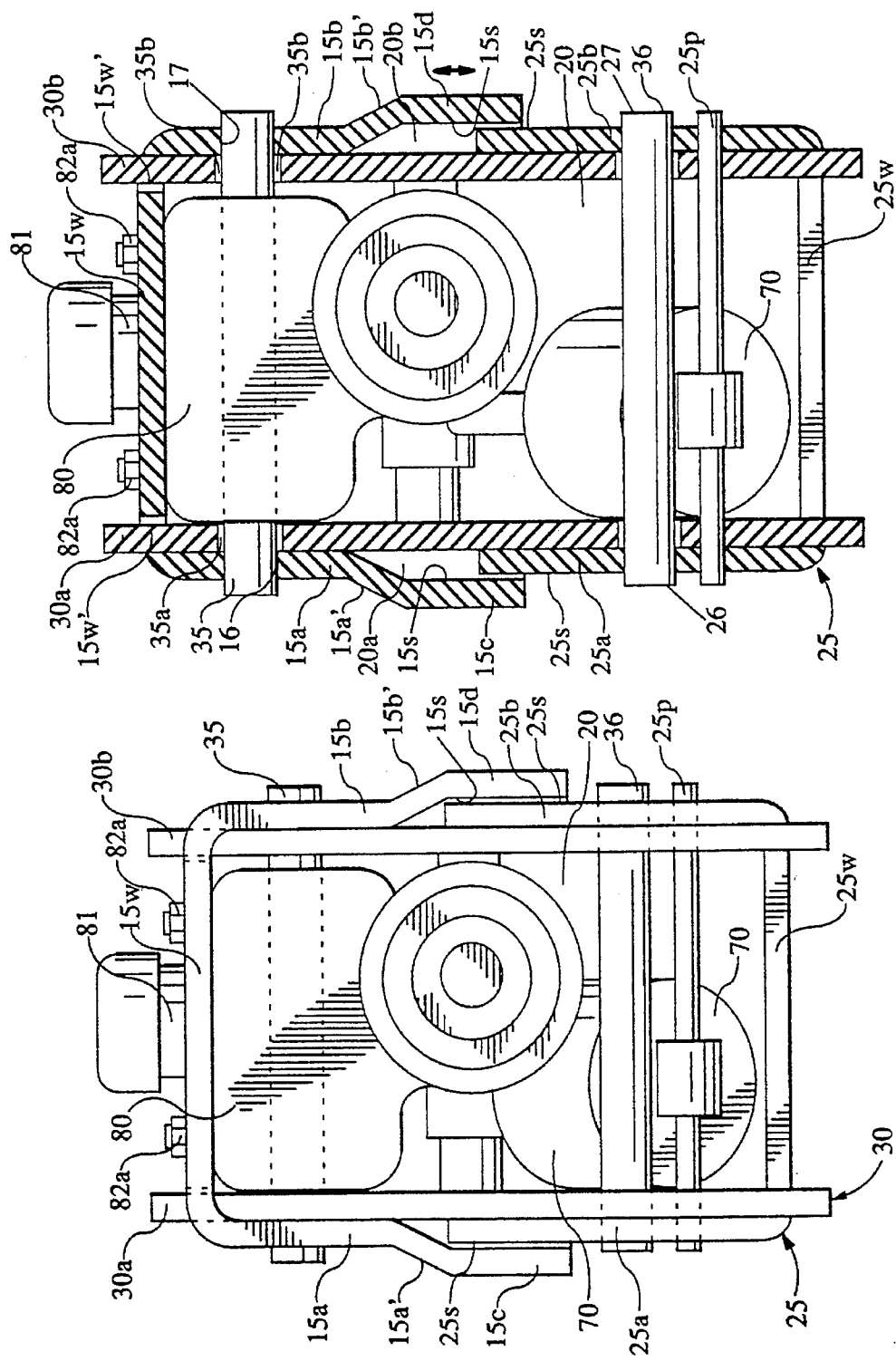
FIG. 4 is a rear elevational view looking in the direction of the arrows along line 4—4 in FIG. 2.
FIG. 5 is a cross-sectional view taken substantially along line 5—5 in FIG. 3.

In the embodiment of the invention illustrated in FIGS. 2 and 5 of the drawing, the first connector 15 comprises a channel-shaped member having a web portion 15w and spaced downwardly extending flanges 15a and 15b.

As best illustrated in FIG. 5 of the drawing, the central portions 15a' and 15b' of flanges 15a and 15b are deflected outwardly such that lower portions 15c and 15d are spaced apart a distance greater than the distance between the upper portions of flanges 15a and 15b.

As best illustrated in FIGS. 3 and 5, openings 16 and 17 are formed in upper portions of flanges 15a and 15b adjacent the rear end thereof to facilitate connection of linkage assembly 30 thereto. Openings 18 and 19 are formed in upper portions of flanges 15a and 15b adjacent the front end thereof to facilitate connection of linkage module 50 thereto.

First connector 15 is configured to facilitate mounting on the tongue T of a straight-tongue trailer in the illustrated embodiment. For an A-frame trailer application, the first connector 15 is welded or otherwise secured to the frame of the trailer. In the illustrated embodiment, holes 13 for receiving bolts are formed in flanges 15a and 15b for mounting the brake actuator 10 on a trailer tongue T, shown in dot-dash outline.

As best illustrated in FIGS. 2 and 5 of the drawing, the web portion 15w has spaced slots 15w' formed therein in the general vicinity of openings 16 and 17 for accommodating a link assembly 30, as will be hereinafter more fully explained. As indicated at 50e at FIGS. 2 and 3 of the drawing, web 15w is embossed to form a curved upper wall of a chamber in which a front linkage module 50 is mounted.

The second connector 25, for securing the disc brake actuator 10 to a towing vehicle (not shown), preferably comprises a generally channel-shaped member having a web portion 25w and spaced flanges 25a and 25b. Openings 26 and 27 are formed in flanges 25a and 25b, respectively, adjacent the rear end of connector 25 and openings 28 and 29 are formed in flanges 25a and 25b, respectively, adjacent the front end thereof.

Flange 25w is cut away, as indicated at 25w' in FIG. 2 of the drawing, inwardly from the rear ends of flanges 25a and 25b to form an opening through which the lower end of rear link assembly 30 extends. An embossment 50e is formed in web 25w adjacent the front end thereof for forming the bottom wall of a chamber into which actuating module 50 extends, as will be hereinafter more fully explained.

As best illustrated in FIGS. 4 and 5 of the drawing, inner guide surfaces 15s on flanges 15c and 15d of the first connector 15 are positioned adjacent outer guide surfaces 25s on flanges 25a and 25b of the second connector 25. The guide surfaces 15s and 25s permit movement of first connector 15 longitudinally relative to the second connector 25. However, guide surfaces 15s and 25s prevent lateral movement of the first connector 15 relative to the second connector 25. In addition to permitting longitudinal movement of the first connector 15 relative to the second connector 25, guide surfaces 15s and 25s permit limited vertical movement of first connector 15 relative to second connector 25 from the position illustrated in FIG. 4 of the drawing to the position illustrated in FIG. 5 of the drawing.

As best illustrated in FIGS. 1 and 2 of the drawing, a coupler, generally designated by the numeral 90, is secured to the front ends of flanges 25a and 25b of the second connector 25. Coupler 90 is preferably a band type coupler of the type disclosed in Pittman U.S. Pat. No. 4,360,217, the disclosure of which is incorporated herein by reference for all purposes. However, the coupler may assume other and further configurations and may be of the type commercially available from Hammerblow Corporation under the registered trademark "Bulldog"; or from other manufacturers such as Atwood or Dico.

The coupler 90 preferably has a coupler body 92 having a ball socket 94 formed therein for receiving a ball on a trailer hitch on a towing vehicle. A locking element 96 in the coupler body 92 is moveable for engagement with a lower portion of a ball positioned in the socket 94.

From the foregoing it should be readily apparent that the first connector 15, connected to a towed vehicle T is urged toward the position illustrated in FIG. 3 of the drawing, when force is applied through coupler 90 to the second connector 25 when a towing vehicle (not shown) is pulling the trailer. However, when brakes are applied on the towing vehicle, thereby limiting movement of the second connector 25, the momentum of the trailer T tends to move the first connector 15 from the position illustrated in FIG. 3 of the drawing toward the position illustrated in FIG. 2 of the drawing.

The rear linkage module 30 and the front linkage module 50 are arranged to position the first connector 15 and the second connector 25 in a relationship such that relative movement of the first and second connectors will not be obstructed by mud, lack of lubrication, rust and the like. Further, spacing between the rear linkage assembly and the front rear module is sufficient to provide a strong rigid structure which is capable of handling loads in a range of 750 pounds to 1,000 pounds, without buckling, in a very light weight structure. The first connector 15 and second connector 25 are maintained in position for efficient transfer of the load from the tongue of the trailer to the master cylinder. The tongue load is supported by the rear linkage assembly 30 and the front linkage module 50 without wedging or urging connectors 15 and 25 into a position in which frictional force would prevent free movement of one of the members relative to the other.

Referring to FIGS. 2–5 of the drawing, a rear linkage assembly 30 connects rear ends of first connector 15 and second connector 25 and a front linkage module 50 connects front portions of first connector 15 and second connector 25.

The rear linkage assembly 30 comprises links 30a and 30b having upper ends pivotally secured to the first connector 15 by a pin 35 having opposite ends extending through openings 16 and 17 in flanges 15a and 15b of the first connector 15. A pin 36 extends through openings formed in lower ends of links 30a and 30b and through openings 26 and 27 formed in flanges 25a and 25b of the second connector 25.

As best illustrated in FIGS. 2 and 5 of the drawing, upper ends of links 30a and 30b extend through slots 15w' formed in web 15w of the first connector 15. Lower ends of links 30a and 30b extend through the opening adjacent the cutaway portion 25w' of the web 25w of the second connector 25. It should be readily apparent that, when a towing vehicle is pulling the trailer, force applied by trailer T to the first connector 15 will be to the left as viewed in FIG. 3 of the drawing while force applied to the second connector 25 will be to the right as viewed in FIG. 3 of the drawing. However, when the brakes of the towing vehicle are applied, the velocity of the second connector 25 will be reduced while the momentum of the trailer will move links 30a and 30b from the position illustrated in FIG. 3 of the drawing to the position illustrated in FIG. 2 of the drawing.

The front linkage module 50 is preferably a casting configured substantially as illustrated in FIGS. 1 and 2 of the drawing to provide upper and lower cylindrical portions extending between spaced generally vertically extending link members adjacent opposite sides thereof and having a lobe portion having upper and lower bumpers 63 and 64 mounted thereon.

Pins 55 and 56 extend through the cylindrical portions 50f of module 50 for securing the module between the first connector 15 and the second connector 25 for pivotal movement similar to the movement of links 30a and 30b, hereinbefore described.

A conventional brake master cylinder 80 has a body portion secured to the first connector 15 and a piston portion 82 connected through a shaft 85 to the front linkage module 50, as best illustrated in FIG. 2 of the drawing.

It should be appreciated that movement of the first connector 15 to the right as illustrated in FIGS. 2 and 5 of the drawing will result in movement of linkage assembly 30 and linkage module 50 in a clockwise direction about pins 35 and 55 from the position illustrated in FIG. 3 of the drawing to the position illustrated in FIG. 2 of the drawing. Linkage assembly 30 and linkage module 50 will rotate about pins 36 and 56 as pins 35 and 55 move from the position illustrated in FIG. 3 to the position illustrated in FIG. 2.

Since the distance from the axis of pin 56 to the axis of pin 55 is greater than the distance from the axis of pin 85 to the axis of pin 55, the module 50 functions as a force multiplying apparatus providing a mechanical advantage such that the magnitude of force exerted on the plunger of master cylinder 80 is greater than the magnitude of force moving the first connector 15 to the right as viewed in FIG. 2.

The locations of the axes of pins 55, 56 and 85 are preferably laid out and located such that when a force of for example 200 pounds is applied, tending to move the first connector 15 to the right as viewed in FIG. 2 of the drawing, maximum pressure of hydraulic fluid in master cylinder 80 is preferably at least 1,500 psi to about 2,000 psi for applying pressure through hydraulic line 88 to conventional brake cylinders (not shown) on wheels of the trailer. Hydraulic pressure up to about 2,000 psi is sufficient for actuating either disc brakes or drum-type brakes on the trailer. It will be appreciated that the values specified above merely provide an example of a range of force and pressure and that other and further magnitudes of force and pressure may be employed.

The disc brake actuator assembly 10 preferably includes a downwardly facing upper channel member 15, an upwardly facing lower channel member 25 positioned below upper channel 15, a rear linkage assembly 30 and a front module 50 pivotally secured to the upper and lower channel members 15 and 25. The brake master hydraulic cylinder 80 and a shock absorber 70 are positioned between the upper and lower channel members 15 and 25.

Flanges 15a and 15b of upper channel member 15 extend downwardly from web 15w, and flanges 25a and 25b of lower channel member 25 extend upwardly from web 25w so that flanges 15a and 15b; 25a and 25b and webs 15w and 25w define a tubular shaped enclosure 20 in which master cylinder 80, linkage assembly 30, front linkage module 50, and shock absorber 70 are contained.

Forward openings 16 and 17 and rearward openings 18 and 19, for receiving pins 55 and 35, are formed in flanges 15a and 15b of upper channel member 15. Forward openings 26 and 27 and rearward openings 28 and 29, for receiving pins 56 and 36, are formed in flanges 25a and 25b of lower channel member 25.

Front linkage module 50 is pivotally mounted between flanges 15a and 15b of upper channel 15 on pin 55 and mounted between flanges 25a and 25b of lower channel on pin 56. Rear links 30a and 30b are pivotally mounted between flanges 15a and 15b of upper channel 15 on pin 35 and between flanges 25a and 25b of lower channel 25 on pin 36.

During operation, upper and lower channel members 15 and 25 shift with respect to each other, pivoting about linkages 30a and 30b and 50 and causing tubular enclosure 20 to have first and second cross-sections. The first, smaller cross-section exists when assembly 10 is in a tow position wherein upper channel 15 shifts toward the towed vehicle and lower channel member 25 shifts toward the towing vehicle, causing the linkages 30a and 30b and 50 to rotate counter-clockwise, as illustrated in FIG. 2. The second, larger cross-section exists when assembly 10 is in a brake position wherein lower channel 25 pushes back toward the towed vehicle, pivoting about the linkages 30a and 30b and 50 in a clockwise direction and causing upper channel member 15 to lift up from lower channel member 25 and then lower down onto the lower channel member 25 which in turn causes flanges 25a and 25b to slide up into the upper channel 15. In order to accommodate the relative vertical movement between upper and lower channel members 15 and 25 and to maintain an essentially closed cross-section in both operating positions, upper channel member 15 is provided with offset flanges 15c and 15d. Offset flanges 15c and 15d provide a clearance 20a and 20b to allow flanges 25a and 25b of lower channel 25 to move up into the upper channel 15 enclosure between flanges 15c and 15d during braking when tubular cross-section 20 is at its minimum. In addition, the length of the offset flanges 15c and 15d is such that it accommodates the full range of relative vertical motion between the two channels 15 and 25.

The rear linkage assembly 30 comprises longitudinal link plates 30a and 30b having upper and lower bushings 35a and 35b and 36a and 36b. Bushings 35a and 36a are located along the bisection line 34a of link plate 30a. Likewise, bushings 35b and 36b are located along center line 34b of link plate 30b. Each end of plate 30a and 30b is coped to have a circular profile concentric with bushings 35a and 35b and 36a and 36b so that linkages 30a and 30b can rotate freely in upper and lower channels 15 and 25. In addition, webs 15w and 25w have rectangular cut-outs 15w' and 25w' to allow rear linkages 30a and 30b to project through webs 15w and 25w, thereby minimizing the overall dimensions of disc brake actuator assembly 10.

As previously stated, front linkage module 50 and rear linkage assembly 30 are pivotally secured to flanges 15a and 15b of upper channel member 15 and to flanges 25a and 25b of lower channel member 25 in tubular enclosure 20 with pins 55 and 56 and 35 and 36. Front linkage module 50 is positioned toward the towing vehicle, while rear linkage assembly 30 is positioned toward the towed vehicle. Between front linkage module 50 and rear linkage assembly 30, an actuator rod assembly 82 and shock absorber 70 are provided which are both pivotally secured to front linkage 50 on pin 85. Actuator arm assembly 82 extends to hydraulic master cylinder 80, which is secured to flanges 15a and 15b of upper channel member 15 on pin 35 and positioned between rear linkages 30a and 30b. In addition, master cylinder 80 is secured to web 15w by bolts 82a or other suitable fastener means. To provide access to the master cylinder 80, upper channel web 15w is provided with an aperture 15p for receiving master cylinder fill port 81.

Shock absorber 70 is provided to absorb some of the impact load generated during braking. The shock absorber 70 is pivotally secured to the forward linkage module 50, as described above, and to flanges 25a and 25b of lower channel member 25 on pin 25p so that clockwise rotation of forward linkage module 50 during braking causes the shock absorber 70 to contract, activating the deceleration characteristics of the shock absorber 70.

Front linkage module 50 comprises upper and lower shoulders 51 and 52, first and second plate linkages 53 and 58, upper and lower bushings 55a and 55b and 56a and 56b and a bumper assembly 60. First and second plate linkages 53 and 58 extend between upper and lower channel members 15 and 25 and are joined in a spaced relationship by upper and lower shoulders 51 and 52. Upper shoulder 51 includes first and second recesses 51a and 51b in which upper bushings 55a and 55b are housed. Lower shoulder 52 also includes first and second recesses 52a and 52b in which lower bushings 56a and 56b are housed. To accommodate front linkage module 50, upper and lower channel webs 15w and 25w are embossed with a profile 50e to match cylindrical portion 50f of module 50 allowing rotation of front linkage module 50 and to increase area of contact between module 50 and webs 15w and 25w for a better load distribution.

Bumper assembly 60 comprises an upper bearing plate element 61, a lower bearing plate element 62, and stiffener plate element 65. Upper bearing plate 61 extends down from upper shoulder 51 at an angle of approximately 20 degrees from pin 55 axis 54a which is normal to the common axis of pins 55 and 56, and is integral with the edges 53e and 58e of linkage plates 53 and 58. The outer surface 61a of upper bearing plate 61 is provided with a bumper pad 63. Lower bearing plate element 62 extends up from lower shoulder 52 at an angle of approximately 40 degrees from pin 56 axis 54b, which is normal to the common axis of pins 55 and 56, and is integral with edges 53e and 58e of linkage plates 53 and 58. The outer surface 52a of lower bearing plate element 62 is provided with a bumper 64. Stiffener plate element 65 joins upper bearing plate 61 and lower bearing plate 62 and is parallel with the common axis of pins 55 and 56, designated line 50a. Bumper assembly 60 stiffens plate linkages 53 and 58 and upper and lower shoulders 51 and 52 by providing uniform support along the full length of each side of the plate linkages.

In addition, when the assembly 10 is in the towing position, lower channel 25 shifts toward the towing vehicle causing rear links 30a and 30b and front linkage module 50 to rotate counter clock-wise causing bumper 63 to bear against web 15w, thereby reducing the load to flanges 15a, 15b, 25a and 25b. During braking, lower channel 25 shifts toward the towed vehicle causing linkages 30a and 30b and 50 to pivot in a clock-wise direction and flanges 25a and 25b of lower channel 25 to move up into the clearance provided by offset flanges 15c and 15d. At the same time, bumper 64 bears against web 25w.

As illustrated in FIG. 2, front linkage module 50 is provided with pin 85 which extends between first plate linkage 53 and second plate linkage 58. Both shock absorber 70 and actuator arm assembly 82 are pivotally secured to pin 85. The location of pin 85 is such that pin 85 translates away from the shock absorber 70 and master cylinder 80 during towing but toward the shock absorber 70 and cylinder 80 when braking. However, the exact location depends on the stroke of the shock absorber and the master cylinder. Typically, pin 85 is located along line 50a which passes through pins 55 and 56 and just slightly below the line that bisects line 50a. When assembly 10 is in a towing position, forward linkage module 50 rotates in a counter-clockwise direction causing pin 85 to translate toward the towed vehicle and to pull actuator arm 82 and to extend shock absorber 70. In the braking position, front linkage module 50 rotates in a clockwise direction causing pin 85 to translate toward the towing vehicle pushing actuator arm 82 into master cylinder 80 and compressing shock absorber 70.

The inner surfaces of embossments 50e in web portions 15w and 25w are bearing surfaces. They support loading carried by cylindrical portions 50f on front linkage module 50 which is in compression while supporting the tongue load. Linkage assembly 30 is normally in tension.

Even though numerous characteristics and advantages of the present invention have been set forth in the foregoing description together with details of the structure and function of the invention, the disclosure is illustrative only. Various changes may be made in detail, especially in matters of shape, size, and arrangement of the parts, within the principles of the invention to the full extent indicated by the broad general meaning of the terms used. The restrictive description and drawings of the specific examples above do not point out what an infringement of this patent would be, but are to provide at least one explanation of how to make and use the invention. The limits of the invention and the bounds of the patent protection are measured by and defined in the appended claims.

I claim:

1. A brake actuator comprising:

a first generally channel-shaped connector member having a web portion and spaced downwardly extending flanges for securing the actuator to a towed vehicle;

a second generally channel-shaped connector member having a web portion and spaced upwardly extending flanges for securing the actuator to a towing vehicle, said web portions of said first and second connector members being mounted for relative movement;

a plurality of links in a parallel linkage assembly having first ends pivotally secured to said first connector member and second ends pivotally secured to said second connector member, at least one of said links having generally cylindrical shaped end portions, said web portions being embossed with a profile to match said generally cylindrical shaped end portions of said link to provide an area of contact between said generally cylindrical shaped end portions and said web portions for load distribution; and a master cylinder having a body portion and a plunger portion, said body portion being connected to one of said first or second connectors, and said plunger portion being connected to at least one of said links such that the magnitude of force applied by said links to said master cylinder is greater than the magnitude of force tending to move said first connector relative to said second connector.

2. A brake actuator according to claim 1, said first and second connector members comprising: elongated connector members having guide surfaces positioned such that one of said connector members is free to move longitudinally relative to the other connector member.

3. A brake actuator according to claim 2, said second elongated connector member extending between said downwardly extending flanges on said first connector member.

4. A brake actuator according to claim 3, said guide surfaces being formed on said flanges of said first and second elongated connector members.

5. A brake actuator according to claim 2, with the addition of: a double acting shock absorber connected between said first and second elongated connector members such that said shock absorber limits the rate of movement of said first elongated connector member relative to said second elongated connector member.

6. A brake actuator according to claim 1, wherein one of said links comprises a linkage module having a central portion pivotally connected to said brake master cylinder to provide a mechanical advantage for actuating said master cylinder.

7. A brake actuator according to claim 6, with the addition of a double acting shock absorber having a body portion pivotally connected to said second connector and having a piston pivotally connected to said first connector, said shock absorber being mounted for controlling the rate of movement of said first connector relative to said second connector.

8. An actuator for trailer brakes according to claim 1, wherein at least one of said links has a central portion and a lobe extending therefrom, said lobe having upper and lower bumpers positioned thereon such that one of said bumpers bears against one of said webs when the actuator is in the towing position, and the other of said bumpers bears against the other of said webs when the actuator is in the braking position, thereby limiting relative movement of said connector members.

9. An actuator for trailer brakes comprising:

(a) trailer hitch coupler means;

(b) a first downwardly facing open section member having an upper web portion and spaced, downwardly extending flanges for mounting on a trailer tongue, said upper web portion forming an upper chamber;

(c) a second upwardly facing open-section member having a lower web portion and spaced upwardly extending flanges, said lower web portions forming a lower chamber, said coupler means being secured to said second upwardly facing open-section member, said second upwardly facing open-section member being positioned below said first downwardly open-section member to define an enclosure therebetween;

(d) a plurality of linkages in said enclosure pivotally connected to said first and second open section members, at least one of said linkages being a module having curved upper and lower compression carrying portions, said upper and lower chambers being formed with inner surfaces matching said curved upper and lower compression carrying portions on said module to provide areas of contact in said enclosure between said module and said web portions for load distribution;

(e) said first open-section member and second open-section member being movable from a towing position wherein said second open-section member translates toward a towing vehicle relative to said first open-section member to a braking position wherein said second open-section member translates back toward the towed vehicle relative to said first open-section member;

(f) a brake master cylinder secured to said first open-section member for delivering hydraulic fluid to brakes on a trailer; and (g) force multiplying means for actuating said brake master cylinder when said first and second open-section members are in said braking position.

10. An actuator for trailer brakes according to claim 9, said force multiplying means comprising: a front linkage and a rear linkage pivotally secured to said first and second open-section members.

11. An actuator for trailer brakes according to claim 10, said means for actuating said master cylinder comprising: a plunger pivotally secured to said front linkage extending to said master cylinder for actuating said brake master cylinder, said plunger being in an extended position when said second open-section member is in the tow position and in a retracted position when said second channel is in said braking posi- 12. An actuator for trailer brakes according to claim 9 further comprising: means connected between said first and second open-section members for absorbing impact loads generated during braking.

13. An actuator for trailer brakes according to claim 12, said means for absorbing impact loads generated during braking comprising: a shock absorber having one end pivotally secured to said front linkage; and a second end pivotally secured to said second open-section member such that said shock absorber is in an extended position during towing and in a retracted position during braking.

14. An actuator for trailer brakes according to claim 9, said force multiplying means comprising:

a linkage assembly;

a linkage module; and means pivotally connecting said linkage assembly and said linkage module between said first downwardly facing open section member and said second upwardly facing open section member such that said first upwardly facing open section member is elevated upon movement from a towing position toward a braking position such that said open section members are not in sliding relation one to the other.

15. An actuator for trailer brakes according to claim 14, said first and second open-section members having bearing surfaces adjacent said linkage module for carrying compression loading.

16. An actuator for trailer brakes according to claim 9, at least one of said open-section members comprising: a channel member.

17. An actuator for trailer brakes according to claim 9, wherein said front linkage has a central portion and a lobe extending therefrom, said lobe having upper and lower bumpers positioned thereon such that one of said bumper bears against one of said webs when the actuator is in the towing position, and the other of said bumpers bears against the other of said webs when the actuator is in the braking position, thereby reducing loads on said pivotal connections in both positions.

* * * * *

UNITED STATES PATENT AND TRADEMARK OFFICE
CERTIFICATE OF CORRECTION

PATENT NO. : 5,464,078

DATED : November 7, 1995

INVENTOR(S) : Jerry W. Pittman

It is certified that error appears in the above-identified patent and that said Letters Patent is hereby corrected as shown below:

Column 8, line 29, change "52a" to --62a--.

Signed and Sealed this

Thirteenth Day of February, 1996

*Attest:*

BRUCE LEHMAN

*Attesting Officer*  *Commissioner of Patents and Trademarks*